United States Patent [19]

Ishikawa

[11] Patent Number: 4,670,661

[45] Date of Patent: Jun. 2, 1987

[54] BATTERY BACKUP CIRCUIT

[75] Inventor: Mamoru Ishikawa, Shizuoka, Japan

[73] Assignee: Tokyo Electric Co., Ltd., Tokyo, Japan

[21] Appl. No.: 754,218

[22] Filed: Jul. 12, 1985

[30] Foreign Application Priority Data

Aug. 1, 1984 [JP] Japan .................. 59-162692

[51] Int. Cl.$^4$ .............................................. H02J 9/00
[52] U.S. Cl. ...................................... 307/66; 307/65; 307/43
[58] Field of Search ................... 307/66, 65, 64, 43

[56] References Cited

U.S. PATENT DOCUMENTS

| 3,293,444 | 12/1966 | Hagopian | 307/66 |
| 3,609,386 | 9/1971 | Patcachi | 307/66 |
| 3,808,452 | 4/1974 | Hutchinson | 307/64 |
| 3,916,212 | 10/1975 | Prochazka et al. | 307/66 |
| 4,272,650 | 6/1981 | Bolgiano et al. | 307/66 |
| 4,441,031 | 4/1984 | Moriya et al. | 307/66 |

FOREIGN PATENT DOCUMENTS 50-129937 10/1975 Japan .
56-38944 4/1981 Japan .
58-93436 6/1983 Japan .
59-156124 9/1984 Japan .

Primary Examiner—William M. Shoop, Jr.
Assistant Examiner—Sharon D. Logan
Attorney, Agent, or Firm—Oblon, Fisher, Spivak, McClelland & Maier

[57] ABSTRACT

A battery backup circuit including n pieces of PC boards which are to be supplied with electric power from a main power source, switches to be turned on or off in response to the voltage of the main power source, a main backup battery for supplying each PC board with backup power when the main power source is cut off by the switch, and a backup battery having smaller capacity than the main backup battery provided on each of the PC boards and put in connection with the main backup battery with runaround preventing diodes interposed therebetween, so that each PC board may be independently supplied with backup power and provided with the even rate of electric power consumption, and that the battery backup circuit may be manufactured at low cost.

6 Claims, 5 Drawing Figures

BATTERY BACKUP CIRCUIT

BACKGROUND OF THE INVENTION

1. Field of the Invention

The present invention relates to a battery backup circuit for supplying backup power when power from a main electric power source is cut off.

2. Description of the Prior Art

There have been used some battery backup circuits which are adapted to provide backup power, when the supply of power from a main power source is cut off, to a circuit or the like which needs the supply of electric power. An example of such circuits is shown in FIGS. 4 and 5. Referring to the drawings, input terminals $T_a$, $T_b$, $T_c$ are each connected with a main power source, in which the input terminal $T_a$ is connected to an output terminal $T_d$ through a switch 1 which is turned ON/OFF in response to the voltage of the main power source. To a junction point of the switch 1 and the output terminal $T_d$ are connected a backup battery 2 and a $\text{diode}_a$ 3 in series, and between a junction point of the backup battery 2 and the $\text{diode}_a$ 3 and the input terminal $T_b$ are connected a resistor R and a $\text{diode}_b$ 4 in series. And the input $T_c$ is grounded. In the described circuit, when the main power source is ON, the electric power from the main power source is supplied to the output terminal $T_d$, and at the same time, the backup battery 2 is charged with electricity. And, when the main power source is OFF, the output terminal $T_d$ is supplied with electric power from the backup battery 2. The $\text{diode}_a$ 3 and $\text{diode}_b$ 4 are for preventing runarounds of electric power.

The battery backup circuit is disposed on a PC board, for example, and in such a case, the backup power is often needed by a plurality of PC boards. FIG. 5 shows an example where backup power is adapted to be supplied to a plurality of PC boards. That is, there are provided n pieces of PC boards, PC $\text{board}_1$ 5, PC $\text{board}_2$ 6, and PC $\text{board}_n$ 7, and a backup circuit 8 is provided only on the PC $\text{board}_1$ 5, wherein the backup circuit 8 is adapted to supply backup power to each PC board when necessary. In this arrangement, there are such disadvantages that, if the PC $\text{board}_1$ 5 is removed, then the PC $\text{board}_2$ 6 and PC $\text{board}_n$ 7 will not be supplied with the backup power, and if the PC $\text{board}_2$ 6 or the PC $\text{board}_n$ 7 is removed, then the removed PC board will not be supplied with the backup power. If, then, the n pieces of the PC boards each are independently provided with a backup circuit 8, the freedom of removing any PC board may be provided, but the circuit will become costly. Such arrangement has a further demerit that the stability of the circuit will be lost since the amounts of electric power to be consumed by the PC boards from respective backup batteries 2 are not even.

SUMMARY OF THE INVENTION

A primary objective of the invention is the provision of backup power for each PC board without using a lot of large capacity batteries.

Another objective of the invention is the provision of a battery backup circuit capable of supplying each PC board with power from a small capacity battery.

A further objective of the invention is to make the consuming rate of electric power by each PC board even.

A still further objective of the invention is the provision of a battery backup circuit which can be manufactured at lower cost.

Other objectives of the invention will become apparent from the following description.

DESCRIPTION OF THE PREFERRED EMBODIMENTS

Figure 1:
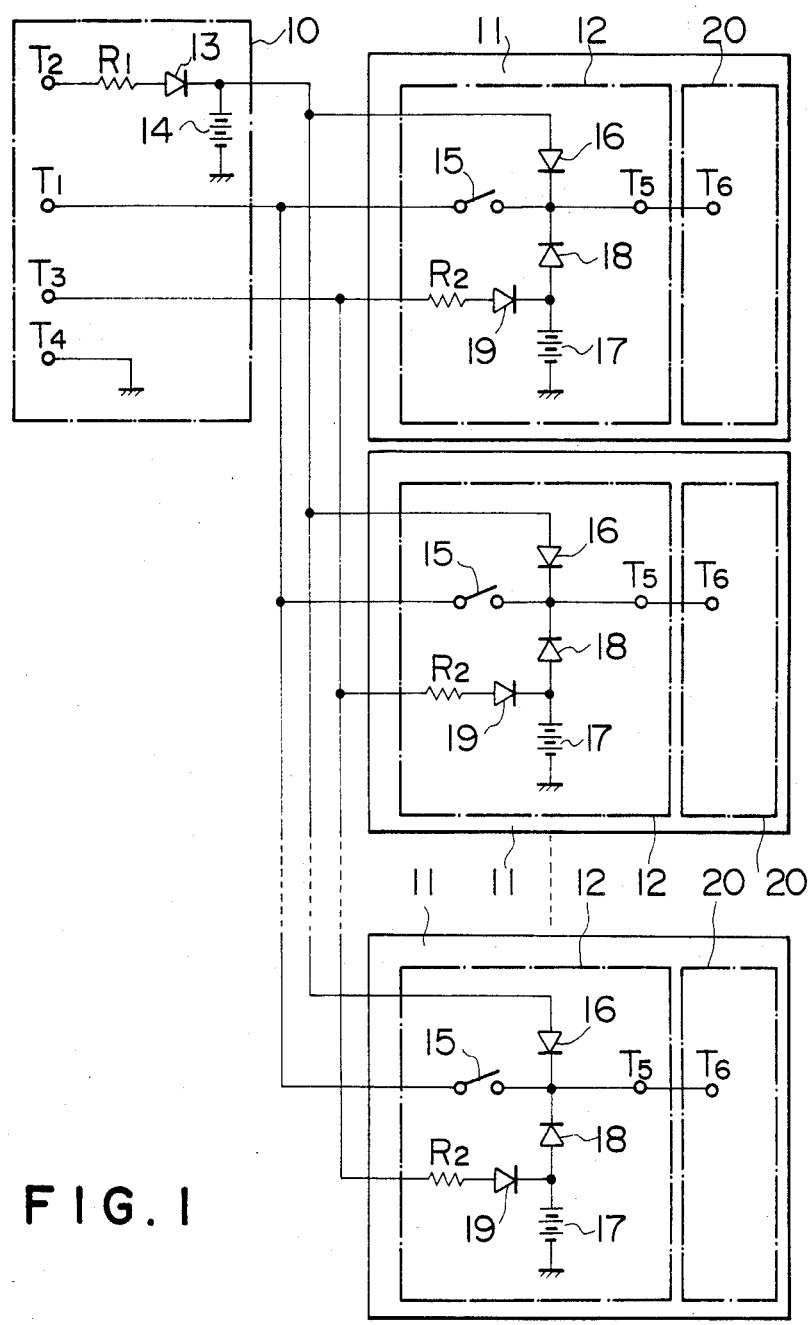
FIG. 1 is a circuit diagram showing a first preferred embodiment of the invention.

A first preferred embodiment of the invention will be described referring to FIG. 1. A battery backup circuit is made up of a main block 10 and subblocks 12 one each thereof being provided on each of n pieces of PC boards 11. In the main block 10, there are provided input terminals $T_1$, $T_2$, $T_3$, and T connected with a main power source, in which the input terminal $T_2$ is connected in series with a resistor $R_1$ and a $\text{diode}_1$ 13, to which $\text{diode}_1$ 13 is connected a main backup battery 14. The input terminal $T_4$ is grounded. In the subblock 12, there is provided an output terminal $T_5$ connected in series with the input terminal $T_1$ through a switch 15, which cooperates with turning ON/OFF of the main power source. To a junction point of the output terminal $T_5$ and the switch 15 are connected in parallel a $\text{diode}_2$ 16, which is connected in series with the main backup battery 14, and a $\text{diode}_3$ 18, which is connected in series with a backup battery 17 having smaller capacity than the main backup battery 14. To a junction point of the $\text{diode}_3$ 18 and the backup battery 17 are connected a resistor $R_2$ and a $\text{diode}_4$ 19 which are connected in series with the input terminal $T_3$.

The PC board 11 is provided with, in addition to the subblock 12, a circuit portion 20 which needs the supply of electric power, an input terminal $T_6$ of the circuit portion 20 being connected with the output terminal $T_5$.

In the described arrangement, when the main power source is ON, electric power is supplied from the output terminal $T_5$ to the circuit portion 20 through the input terminal $T_6$. And at the same time, both the main backup battery 14 and the backup battery 17 are charged by electric power from the main power source. Meanwhile, the $\text{diode}_1$ 13 and the $\text{diode}_4$ 19 prevent runarounds of electric power.

When the main power source is turned OFF, the switch 15 in cooperation therewith is turned OFF, and at this time, each subblock 12 receives the supply of electric power from whichever having higher voltage of the main backup battery 14 and the backup battery 17. If, then, a specific board 11 is removed, the subblock 12 on the removed PC board 11 is cut off from the supply of electric power from the main backup battery 14 and receives the supply of backup power only from the backup battery 17 present in the subblock 12. Meanwhile, the $\text{diode}_2$ 16 and the $\text{diode}_3$ 18 serve for preventing runarounds of electric power.

As described above, when the main power supply has been turned OFF, the backup power is eventually supplied to each PC board 11 from the main backup battery 14 having larger capacity, and therefore, even if the PC boards are not equal in their amounts of power consumption, no one will be faster or slower in the power exhausting rates. And, since the backup battery 17 is required to supply the backup power only to the removed PC board 11, it can be of a small capacity. Thus, although the backup circuit is provided with the backup battery 17 disposed on each PC board 11, it requires a battery of a higher capacity only for the main backup battery 14. Consequently, the backup circuit can be provided at lower cost.

Figure 2:
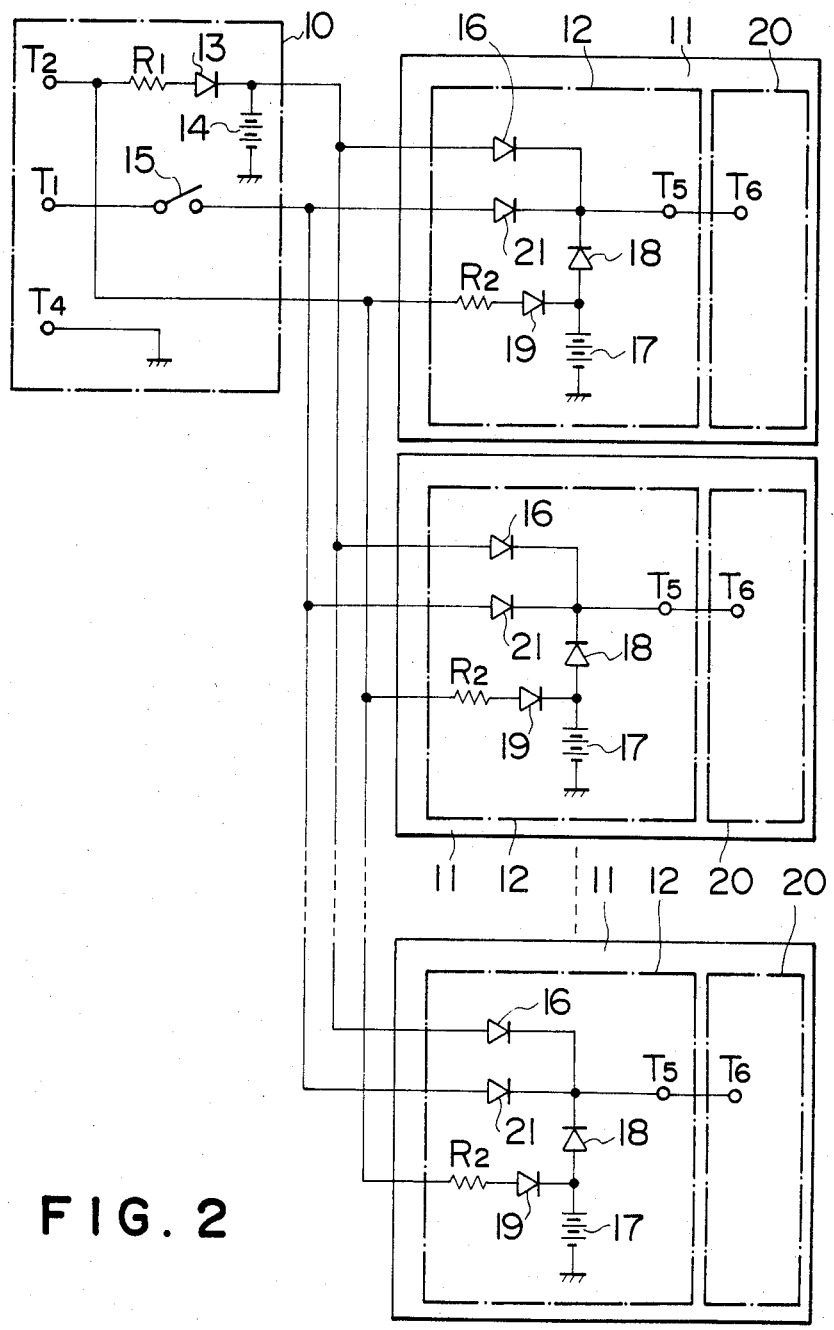
FIG. 2 is a circuit diagram showing a second preferred embodiment of the invention.

A second preferred embodiment of the invention will be described below with reference to FIG. 2, wherein like parts to those in the first preferred embodiment are indicated by corresponding reference characters and description thereof may be omitted (this will be applicable to all the drawings that follow). In the present embodiment, the switch 15 is provided within the main block 10, a $diode_5$ 21 is provided within each subblock 12 connected in series between the switch 15 and a junction point of the main backup battery 14 and the backup battery 17, and the input terminal $T_3$ is combined with the input terminal $T_2$. By the described arrangement, it becomes possible to save the number of the switches 15 and simplify the structure of the overall circuit. The function of the $diode_5$ 21 is to prevent a runaround of electric power from the backup battery 17 on the PC board 11 to which the $diode_5$ 21 belongs to other PC boards 11.

Figure 3:
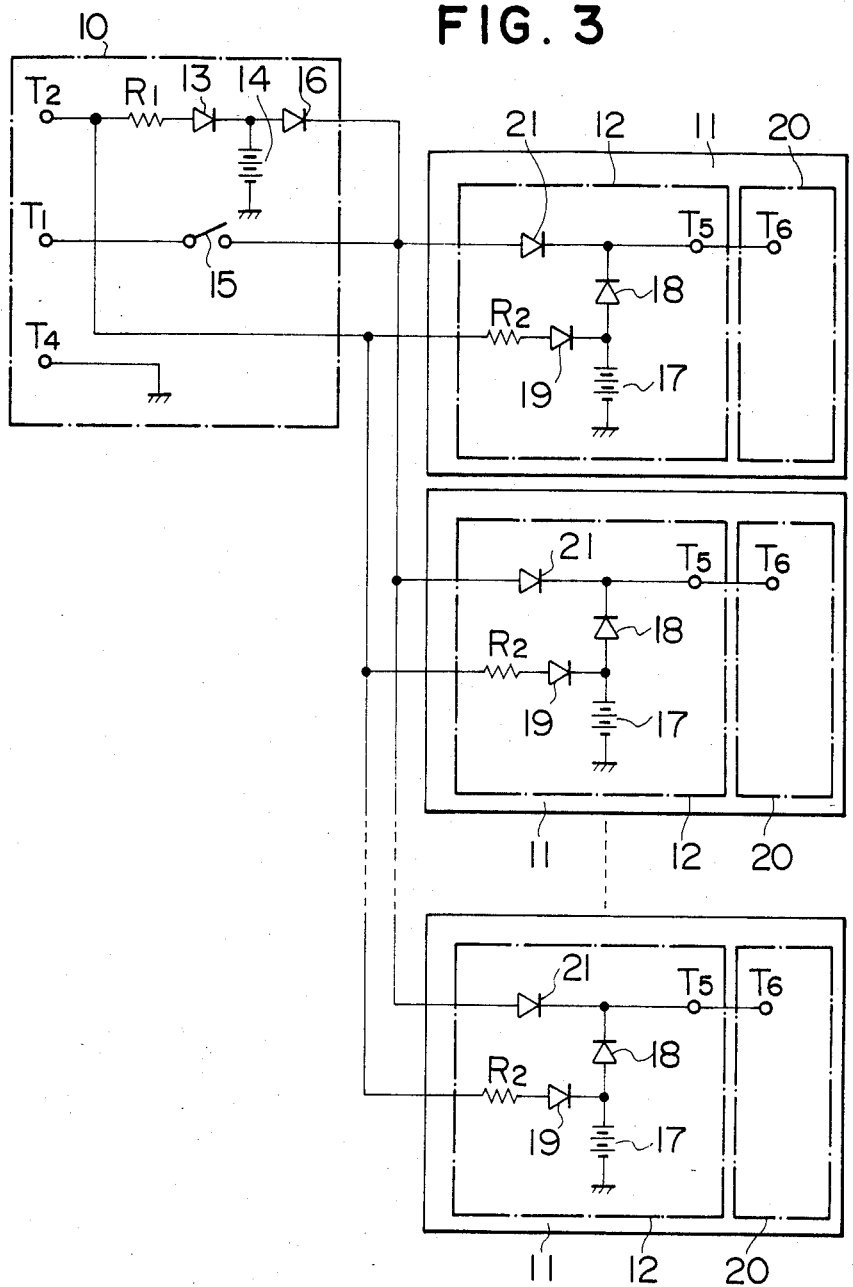
FIG. 3 is a circuit diagram showing a third preferred embodiment of the invention.
Figure 4:
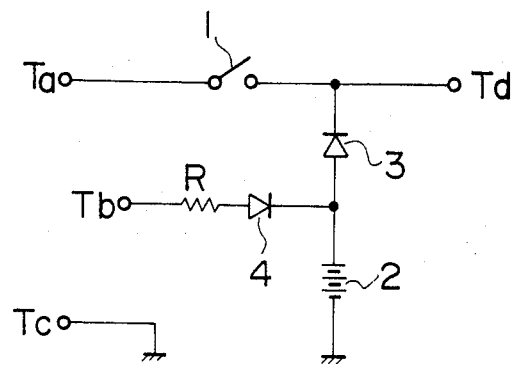
FIG. 4 is a circuit diagram showing an example of conventional battery backup circuit.
Figure 5:
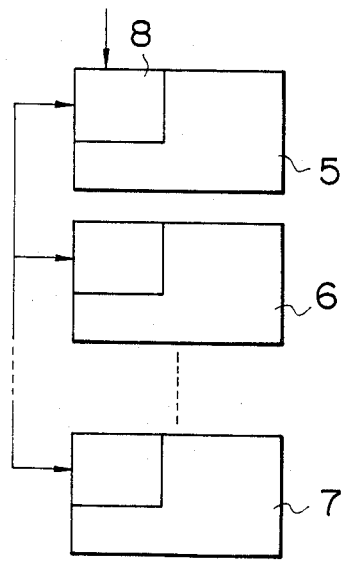
FIG. 5 is a schematic block diagram showing a state of supplying backup power to each PC board.

Now, a third preferred embodiment of the invention will be described with reference to FIG. 3. In the present embodiment, the $diode_2$ 16 and the switch 15 are provided within the main block 10, the diode 21 is provided within each subblock 12 connected in series between the switch 15 and the backup battery 17, the input terminal $T_3$ is combined with the input terminal $T_2$, and the $diode_2$ 16 provided within the main block 10 is connected to a point between the switch 15 and the $diode_5$ 21. By the described arrangement, the numbers of the switches 15 and the $diodes_2$ 16 can be saved and the structure of the overall circuit simplified.

By the way, unrechargeable batteries, or primary batteries, may also be used in carrying out the invention.

As described so far, the present invention is arranged, in a battery backup circuit wherein n pieces of PC boards are to be supplied with backup power from a main backup battery, such that a backup battery of lower capacity than the main backup battery is provided on each PC board connected to the main backup battery with runaround preventing diodes interposed therebetween. Therefore, it is enabled to supply electric power independently for each PC board and it has been made possible to remove any PC board at will. Since the power consumption rates are made equal for all the PC boards, the backup circuit can be operated in a stable state. Further, since a larger capacity of battery is required only for the main backup battery, the backup circuit can be constructed less costly.

What is claimed is:

1. A battery backup circuit comprising a main block and n pieces of PC boards to be supplied with electric power from a main power source, a switch means to be turned on or off in response to the voltage of the main power source, a main backup battery on said main block for supplying each PC board with backup power when the main power source is cut off by said switch means, and a backup battery having a smaller capacity than said main backup battery provided on each of the PC boards being put in connection with said main backup battery with at least one runaround preventing diode interposed between said main backup battery and each of said backup batteries.

2. A battery backup circuit according to claim 1, wherein said switch means is a single switch provided on the main block and a runaround preventing diode is provided on each of the PC boards.

3. A battery backup circuit according to claim 2, wherein only one main runaround preventing diode for said main backup battery is provided on the main block and the same is connected between said main backup battery and said runaround preventing diode provided on each of the PC boards.

4. A battery backup circuit according to claim 1, wherein said switch provided on each PC board.

5. A battery backup circuit according to claim 4, wherein a runaround preventing diode is provided on each of the PC boards.

6. A battery backup circuit according to claim 2, wherein the runaround preventing diode provided on each of the PC boards is connected between said switch and a junction point of said main backup battery and said backup battery.

* * * * *